Patented Dec. 13, 1949

2,491,051

UNITED STATES PATENT OFFICE 2,491,051

METHOD OF PRODUCING ADSORBENT CLEANING COMPOSITION

William S. W. McCarter, Ardmore, Pa., assignor to Attapulgus Clay Company, Philadelphia, Pa., a corporation of Delaware No Drawing. Application December 2, 1947, Serial No. 789,338

5 Claims. (Cl. 252—89)

The present invention relates to improved adsorbent cleaning composition and method of making same, and relates more particularly to low density, highly adsorptive clay-type compositions suitable for use in removing oil, grease, water and the like from surfaces such as wooden or concrete floors, linoleum, paper and fabrics.

I have found that satisfactory cleaning compositions should be characterized by a high oil retention, a low density or volume weight, and a high resistance to attrition or breakdown upon use. Low bulk density or volume weight is desired because the lower the volume weight, the greater the surface area which can be covered by a given weight of cleaning composition. Hardness or resistance to attrition is necessary, since a soft, readily powdered material is difficult to remove from the surface being cleaned. High oil retention is desirable in order that a minimum amount of the cleaning composition may be used in removing oil, grease and the like from the surface being cleaned.

It is obvious, however, that a decrease in volume weight of the cleaning composition without any change in other properties does not constitute an improvement. For example, let it be assumed that two adsorbent cleaners have the same oil retention upon a weight basis, but that the first cleaner has one-half the volume weight of the second. The first cleaner will have twice the covering power of the second, assuming that layers of equal thickness are used. In spite of the greater covering power, the first cleaner is not better than the second because in order to adsorb the same amount of oil per unit area, the layer of the first cleaner would have to be twice as thick as that of the second cleaner. In general, a lowering of volume weight is desirable if the oil retention can be increased correspondingly, and the factor which shows the relative merits of various cleaners is the oil retention on the volume basis.

I have found that improved adsorbent cleaning compositions may be prepared by incorporating with a plastic adsorbent clay, a suitable quantity of a surface active agent, intimately admixing the clay and surface active agent, drying the mixture, reducing the dried material to granules of desired size, and calcining the granules at elevated temperature.

In accordance with my invention, a small amount of a surface active agent is incorporated in an adsorbent clay such as fuller's earth, and the water content of the mixture is adjusted to a value between 40% and 60% by weight, and preferably between 53% and 56% by weight, to give a plastic earth. The ratio of active agent to fuller's earth may range from 0.1 part to 5 parts by weight. Preferably, however, the quantity of active agent will range from 0.5 to 2 parts by weight, based upon dry fuller's earth. The incorporation of the surface active agent may be effected in several ways. For example, the agent may be present in the water which is added to the earth to bring it to a volatile matter content (water content) suitable for mixing and extrusion. Alternatively, the earth may be reduced to a just-fluid condition or slurry by the addition of water, after which the surface active agent may be added, and the mass then dried to a volatile matter content (50% to 60% by weight) suitable for extrusion. The mixing of the earth and agent may be carried out in a pug mill or other conventional mixer, and the plastic mixture is then delivered to an auger extrusion machine provided with a die plate containing a plurality of holes of suitable diameter, for example, ¼ inch to 1 inch in diameter depending upon the size and output of the extrusion machine. The plastic mixture, in passing through the extruder is thoroughly kneaded and compressed, and is discharged through the die plate orifices in the form of cylindrical pieces of irregular length. The pressure at the die plate may range from 100 to 3 000 pounds per square inch, depending upon the volatile matter content of the earth being extruded. The extruded material is then dried at temperatures between 200° F. and 300° F. to remove the bulk of the free moisture, and the dried material is then ground and screened to give granules of desired particle size, for example, 10/60 mesh, 30/60 mesh, etc. The granular material is then calcined by heating in a kiln or clay burner at an elevated temperature preferably between 750° F. and 1200° F. until the volatile matter content is reduced to 10% by weight or lower, for example, 1% to 5% by weight. There is thus obtained an adsorbent cleaning composition of lower volume weight and higher oil retention than is produced by a similar treatment of fuller's earth without the added surface active agent. While it is preferred to use an extrusion machine in conjunction with a pug mill to obtain uniformity and hardness of product, the mixing of the fuller's earth and the surface active agent to form a plastic mixture may be carried out in a pug mill alone, and the mixture may be discharged directly into suitable drying equipment. After drying, the mixture is then ground, screened, and calcined as described hereinbefore.

The adsorbent clay employed in accordance with this invention is preferably fuller's earth of the type mined in Georgia and Florida, although earths from other sources may be used. As mined, the raw fuller's earth usually has a total volatile matter content (mostly water) of the order of 47% to 49% by weight, and this water content must be taken into account in preparing the fuller's earth-surface active agent mixtures, all calculations being made upon the basis of dry earth. For example, in 100 parts of a plastic mixture suitable for extrusion, the fuller's earth may comprise 45.5 parts by weight (dry), the surface active agent 0.5 parts by weight, and water 54 parts by weight. The proportion of surface active agent to fuller's earth may vary between 0.1 and 5 parts by weight, but the water content is preferably maintained between 50 and 60 parts per 100 parts of the total mixture.

The surface active agents which may be used in accordance with this invention may be anionic, cationic, or non-ionic in type. Among the agents which may be employed are diisobutyl sodium sulfo succinate, dioctyl sodium sulfo succinate, alkali metal salts of alkylated aryl sulfonic acids in which the benzene or naphthalene nucleus is substituted by one or more alkyl groups of from 3 to 20 carbon atoms, alkali metal salts of sulfated higher alcohols of from 8 to 18 carbon atoms such as lauryl alcohol, oleyl alcohol, etc., alkali metal salts of petroleum naphthenic and sulfonic acids, and alkali metal salts of the higher fatty acids such as lauric acid, myristic acid, oleic acid, ricinoleic acid, hydroxystearic acid, or the sulfonated fatty acids. In lieu of the alkali metals, other basic compounds such as ammonia, aliphatic amines, aromatic amines, hydroxy amines, and heterocyclic nitrogen bases may be used to form the salts or soaps of the acids above mentioned. Other surface active agents may be exemplified by sulfonated esters, ethanolated alkyl guanidine complexes, glycol laurate, beta-lauramidoethanol, amino-acet-dodecyl amide, alpha-thiopalmitamide sulfonic acid, beta-benzyl thiolethane sulfonhexadecyl amide, dodecyl thiophosphate, sulfonated esters of thioethers containing hydroxy groups, aryl groups, or double bonds, phenolaldehyde resins esterified with oleic acid or lauric acid and then sulfonated, sulfonacetic acid ester of cholesterol, sulfated hexyl and methylcyclohexanol, and the like.

My invention may be further illustrated by the following examples, which, however, are not to be construed as limiting the scope thereof.

1% of surface active agent, based on the volatile-free weight fuller's earth was added to and mixed with a thick slurry of Georgia-Florida fuller's earth in water, and the mass then dried to a volatile content (water content) of 54% by weight. The mixture was then charged to an auger extrusion machine provided with a die plate ½ inch in thickness and containing a plurality of apertures each ⅜ inch in diameter. The mixture was extruded from the die plate apertures at an elevated pressure above 100 pounds per square inch in the form of relatively hard, cylindrical rods of irregular length. The extruded material was dried at 220° F. to a moisture content between 15% and 30% by weight, and the dried material was ground and screened to produce granules of 10/60 mesh. The granular material was then calcined at elevated temperature (900° F.) to give a volatile matter content of not more than about 5% by weight. The volatile matter content was determined by heating a weighed sample at 1800° F. for 30 minutes, cooling and reweighing to obtain the percent loss. The calcined granular material was tested for volume weight and for oil retention according to the following methods.

Volume weight was obtained by settling the granular material under regulated conditions. Reproducible settling conditions are achieved through the use of a device which repeatedly lifts and drops a container of the material a fixed distance, at a definite rate, and for a measured period of time. A graduated glass cylinder of 100 cc. capacity is filled with the granular material and clamped to a reciprocating platform which is raised and lowered through a distance of ⅛ inch by means of a cam rotating at 250 R. P. M. The settling device is operated for exactly 5 minutes, and the cylinder is refilled to the 100 cc. mark by carefully adding more granular material through a funnel, the cylinder not being moved or jarred during the addition of the "make-up." The cylinder and contents is weighed to the nearest 0.1 gram, then emptied and weighed empty. The difference represents the weight of 100 cc. of granular material, which is readily converted to pounds per cubic foot.

Oil retention on a weight basis was obtained by mixing 50 grams of the granular material with an excess of a standard lubricating oil described below, pouring the mixture on a 4 inch Buchner funnel and sucking the contents of the funnel dry by applying reduced pressure (16 inches mercury) for 2 hours at 150° F. The granular material is reweighed and the gain in weight is retained oil. From the value found for 50 grams of materials, the oil retention in pounds per pound of material can readily be calculated. To determine the oil retention on the volume basis, it is necessary only to multiply the volume weight of the granular material by the value for the oil retention on the weight basis. The oil employed had the following properties:

Saybolt Universal viscosity at
  100° F. _____ 716 seconds
Saybolt Universal viscosity at
  210° F. _____ 62.4 seconds
A. P. I. gravity _____ 21.3°
Flash point _____ 405° F.
Fire point _____ 480° F.
Pour test _____ 0° F.
Color (A. S. T. M.) _____ 3½

Other lubricating oils generally similar in properties, particularly viscosity, may be used in lieu of the above without materially changing the test results.

The results of the tests on compositions prepared with various surface active agents as hereinbefore described are given in the following table.

| Surface Active Agent | Fuller's earth product | | |
|---|---|---|---|
| | Volume weight, lbs./cu. ft. | Oil Retent. Weight, lbs. per lb. | Oil Retent. Volume, lbs./cu. ft. |
| None | 32.9 | 0.732 | 24.1 |
| polyglycol-amine condensation product | 28.9 | 1.042 | 30.1 |
| sulfonated cocoanut oil fatty acid methyl ester | 29.0 | 1.000 | 29.0 |
| glycol laurate | 28.4 | 0.930 | 26.4 |
| dodecyl benzene sodium sulfonate | 27.8 | 0.939 | 26.1 |
| ethanolated alkyl guanidine complex | 27.7 | 0.910 | 25.2 |
| diisobutyl sodium sulfo succinate | 28.7 | 1.010 | 29.0 |
| dioctyl sodium sulfo succinate | 28.1 | 0.946 | 26.6 |
| decyl benzene sodium sulfonate | 27.8 | 0.973 | 27.1 |

In another series of tests, 2% by weight of surface active agent based on the volatile-free weight of fuller's earth was dissolved in the quantity of water necessary to bring the volatile matter content of the earth to 54% by weight. The solution of surface active agent in water was added to the earth and mixed in a pug-mill, then extruded dried, ground, and calcined as described with reference to the above examples. The results are given in the following table.

| Surface Active Agent | Fuller's earth product | | |
|---|---|---|---|
| | Volume weight, lbs./cu. ft. | Oil Retent. Weight, lbs. per lb. | Oil Retent. Volume, lbs./cu. ft. |
| None | 32.9 | 0.730 | 24.0 |
| decyl benzene sodium sulfonate | 27.6 | 1.000 | 27.6 |
| sulfated lauryl alcohol sodium salt | 28.5 | 0.948 | 27.0 |
| sodium salts of $C_9$-$C_{12}$ alkyl benzene sulfonic acids | 29.3 | 0.934 | 27.4 |

From the above data, it will be seen that improved adsorbent cleaning compositions may be obtained by incorporating an organic surface active agent with the plastic fuller's earth, extruding the mixture, and calcining the granular product. In general, I have found that compositions, particularly 10/60 mesh compositions having a volume weight between 27 and 30 pounds per cubic foot, and oil retention between 0.9 and 1.0 pounds per pound of earth, and between 26 and 30 pounds per cubic foot of earth, and a volatile matter content of not more than 10%, are markedly superior to ordinary fuller's earth as cleaners for oil, grease, and the like. My improvement resides in decreasing the volume weight, thereby increasing the covering power, without adversely affecting the oil retention on the volume basis. In employing an organic surface active agent in amounts ranging from 0.1% to 5%, and preferably from 0.5% to 2%, I am able to produce highly efficient cleaning compositions having a satisfactory hardness and resistance to disintegration, together with a high oil retention.

Herein, and in the appended claims, the term "surface active agent" includes organic compounds and alkali metal derivatives thereof which in small concentrations, i. e., 5% or less, will substantially reduce the surface tension of water to a value not exceeding 35 dynes/cm. at ordinary temperature (20° C.).

I claim:

1. A method of producing an adsorbent cleaning composition, which consists in incorporating from 0.1% to 5% by weight of a surface active agent in plastic fuller's earth the water content of which is between 50% and 60% by weight, drying the mixture, reducing the dried mixture to granular particles, and calcining the granular particles at a temperature between 750° F. and 1200° F.

2. A method of producing an adsorbent cleaning composition, which consists in adding 0.1% to 5% by weight of a surface active agent to fuller's earth, adjusting the water content of the mixture to a value between 50% and 60% by weight, extruding the mixture at an elevated pressure, drying the extruded mixture, reducing the dried mixture to granular particles, and calcining the granular particles at a temperature between 750° F. and 1200° F.

3. A method of producing an adsorbent cleaning composition, which consists in adding 0.1% to 5% by weight of a surface active agent to fuller's earth, adjusting the water content of the mixture to a value between 50% and 60% by weight, extruding the mixture at a pressure between 100 and 3,000 pounds per square inch, drying the extruded mixture, reducing the dried mixture to granular particles, and calcining the granular particles at a temperature between 750° F. and 1200° F.

4. A method of producing an adsorbent cleaning composition, which consists in adding 0.5% to 2% by weight of a surface active agent to fuller's earth, adjusting the water content of the mixture to a value between 53% and 56% by weight, extruding the mixture at a pressure between 100 and 3,000 pounds per square inch, drying the extruded mixture at 200° F. to 300° F., reducing the dried mixture to granular particles, and calcining the granular particles at a temperature between 750° F. and 1200° F.

5. A method of producing an adsorbent cleaning composition, which consists in forming a slurry of fuller's earth with water containing from 0.5% to 2% of a surface active agent by weight based on the earth, drying the slurry to a water content of about 54% by weight, extruding the resulting plastic mixture at a pressure between 100 and 3,000 pounds per square inch, drying the extruded mixture at 200° F. to 300° F. to a water content of 15% to 30% by weight, reducing the dried mixture to granular particles, and calcining the granular particles at a temperature between 750° F. and 1200° F.

WILLIAM S. W. McCARTER.

REFERENCES CITED

The following references are of record in the file of this patent:

UNITED STATES PATENTS

| Number | Name | Date |
|---|---|---|
| 1,759,783 | Gergele | May 20, 1930 |
| 2,222,400 | Butz | Nov. 19, 1940 |
| 2,315,410 | Fitz Simons | Mar. 30, 1943 |
| 2,363,876 | La Lande, Jr. | Nov. 28, 1944 |

OTHER REFERENCES

Gregory: "Uses and Applications of Chemicals and Related Materials," vol. II, Reinhold Pub. Corp., N. Y. C., N. Y. (1944), pp. 144 and 145.

The Aerosol Wetting Agents, American Cyanamid and Chemical Corp., N. Y. C., N. Y. (1938), page 23.